(12) United States Patent
Maltbie (10) Patent No.: US 10,343,155 B1
(45) Date of Patent: Jul. 9, 2019

(54) CONTINUOUS RESIN REGENERATION SYSTEM

(71) Applicant: Earl Maltbie, Canton, KS (US)

(72) Inventor: Earl Maltbie, Canton, KS (US)

( * ) Notice: Subject to any disclaimer, the term of this patent is extended or adjusted under 35 U.S.C. 154(b) by 0 days.

(21) Appl. No.: 16/179,310

(22) Filed: Nov. 2, 2018

Related U.S. Application Data (60) Provisional application No. 62/622,248, filed on Jan. 26, 2018.

(51) Int. Cl.

| | |
|---|---|
| *C02F 1/42* | (2006.01) |
| *B01J 49/16* | (2017.01) |
| *B01J 49/53* | (2017.01) |
| *B01J 49/57* | (2017.01) |
| *B01J 39/07* | (2017.01) |
| *B01J 41/07* | (2017.01) |
| *B01J 41/12* | (2017.01) |
| *B01J 39/18* | (2017.01) |
| *B01J 49/85* | (2017.01) |
| *B01J 47/028* | (2017.01) |

(52) U.S. Cl.
CPC ............... *B01J 49/16* (2017.01); *B01J 39/07* (2017.01); *B01J 39/18* (2013.01); *B01J 41/07* (2017.01); *B01J 41/12* (2013.01); *B01J 49/53* (2017.01); *B01J 49/57* (2017.01); *B01J 49/85* (2017.01); *C02F 1/42* (2013.01); *B01J 47/028* (2013.01); *C02F 2001/422* (2013.01); *C02F 2001/425* (2013.01); *C02F 2209/10* (2013.01); *C02F 2303/16* (2013.01)

(58) Field of Classification Search
CPC ... B01J 39/07; B01J 39/18; B01J 41/07; B01J 41/12; B01J 47/028; B01J 49/10; B01J 49/12; B01J 49/14; B01J 49/16; B01J 49/53; B01J 49/57; B01J 49/80; B01J 49/85; C02F 1/42; C02F 2001/422; C02F 2001/425; C02F 2209/10; C02F 2303/16
USPC ................................. 210/662, 675, 676, 685
See application file for complete search history.

(56) References Cited

U.S. PATENT DOCUMENTS

| | | | |
|---|---|---|---|
| 3,607,740 A * | 9/1971 | Akeroyd | B01J 47/10 210/223 |
| 9,670,075 B1 * | 6/2017 | Wegner | C02F 1/42 |
| 2016/0031722 A1 * | 2/2016 | Schonfeld | C02F 1/28 210/676 |

* cited by examiner

*Primary Examiner* — Matthew O Savage
(74) *Attorney, Agent, or Firm* — Dale J. Ream (57) ABSTRACT

A continuous resin regeneration system includes a process by which resin in need of being recharged is continuously cycled out of a filtration "column" as new resin is flowed in. Downstream filtration columns also undergo this cycling but at slower and related rates as the first column with the dirtiest water will naturally degrade resin faster than the downstream columns. Contaminated water is cleaned by the continuously cycled resin in multiple columns. The degree of cleaning of earlier filtration columns affects the resin flow rate of later filtration columns.

15 Claims, 5 Drawing Sheets

CONTINUOUS RESIN REGENERATION SYSTEM

REFERENCE TO RELATED APPLICATIONS

This application claims the priority of provisional patent application U.S. Ser. No. 62/622,248 filed Jan. 26, 2018 titled Continuous Resin Regeneration System and which is incorporated in its entirety herein by reference.

BACKGROUND OF THE INVENTION

This invention relates to resin regeneration systems and, more particularly, to a continuous resin regeneration system in which resin is cycled out of multiple filtration columns simultaneously and continuously at predetermined and corresponding rates and returned systematically to the filtration system.

Resins are used to draw charged particles out of waste water in various applications (water is considered a byproduct in many industrial settings). Water is passed over resins which draw out the particles and the particles are then recovered from the resins in filtration processes. Although such systems are presumably effective for recycling or recharging resins, the resins in the past have been used in "batches" as the resins have a regeneration cycle and must be replaced with new resin (and the used resin can be removed offsite to be "cleaned)." The problem is, then, the down time while changing the resin.

Therefore, it would be desirable to have a resin regeneration system in which resin in need of being recharged is cycled out of a filtration "column" (like a hopper) as new "clean" resin is flowed in. Further, it would be desirable to have a resin regeneration system in which downstream additional columns also undergo this cycling but at slower and related rates as the first column with the dirtiest water will naturally use up resin faster than the downstream columns.

The first novelty of the present invention is the continuous flow and regeneration of resin (rather than batch processing which has repeated downtime for replacement). The secondary novelty is the variable rates by which multiple columns can detect the flow rate by which degenerative resin needs to flow out and be replaced with fully charged resin.

SUMMARY OF THE INVENTION

Water is generally considered to be a waste product by industry. The control of water management costs is of increasing importance in all fields.

The utilization of charged resin has been done in small lot systems. The reason for limited utilization is that resin can only be used to the point at which the resin's capability to draw charged material out of the water—depleted by blinding of the charge by particulates removed from the water—limits its usable life.

A system is proposed that will allow the resin to be used for a prolonged period of continuous utilization.

There are two primary functions required to promote continuous use:
1. Cleaning of the resin on a continuous basis.
2. Recharging of the resin as required.

That being said, the resin replacement would only be necessary if the resin particle size has been reduced through degradation (also referred to as degeneration).

The system will be filled with two types of resin.

Ion exchange resins are classified as cation exchangers which exchange positively charged ions and anion exchangers that exchange negatively charged ions.

Preferably, the present invention uses a Weak Acid Cation (WAC) resin and a Weak Base Anion Resin.

To insure that the maximum contact time can be achieved, the resin flows from the top of the resin column to the bottom. The water flows through the column from the bottom of the column to the top. As the water enters the column, it passes through a screen that is used to contain the resin. As the water flows through the resin in the column, the water is allowed to flow out of the column through another resin retention screen. Water flows to each of the columns until it is discharged from the system.

The screen spools or screeners are independent units which are interchangeable from top to bottom or from one column to another. The flow of water goes through a variable number of columns depending on the condition of the water being supplied to the system. As water flows through the resin, material is collected, thus coating the resin. As resin leaves the bottom of the column, it is transferred by an air diaphragm pump to the first of two screeners in this system.

When the resin enters a screener, a dewatering step occurs, that is to say, the water used to carry the resin to the screener is allowed to pass through the screen. As the resin moves down the screen, pre-conditioned water is sprayed onto the resin. Contaminates are then released from the surface of the resin. Both the water that has been removed from the resin and the water washing the resin are collected in a pan under the screener. The water from the first stage screeners, from both the cation and anion systems, is pumped by an end suction centrifugal pump to a holding hopper.

From the hopper, water passes through a deep bed filter. Water is then pumped back into the supply line feeding the RFS unit. The resin drops off the screener into a holding hopper full of pre-conditioned water. The resin soaks in the treated solution for as long as possible. The resin is then pumped by a dual diaphragm pump to the second screener, where dewatering and cleaning occurs again. The water is collected in a pan under the screener and gravity flows back to a deep bed filter. The water passing through the filter media is then pumped by a centrifugal pump back to the spray wash or a holding hopper for reconditioning. When the resin drops out of the second screener, it is collected in a holding hopper. Clean water is added and the resin is pumped back to the top of the column, as determined by a TDS meter. The treated water, be it cation or anion, receives approximately 6% solution of acid or base. The dilution is determined by an ORP meter.

In all existing resin applications, the resin is used in a batch system—meaning that the resins are used until the charged resin can no longer attract material dissolved in the water. At this point, the resin must be removed and replaced with suitable charged resin.

The present system allows for continuous cleaning and recharging of resin while using the same resin for an extended period of time. However, degradation of the resin will require replacement at some point in time.

Therefore, a general object of this invention is to provide a resin regeneration system in which resin is cycled out of multiple filtration columns simultaneously and continuously at predetermined and corresponding rates and returned systematically to the filtration system.

Another object of this invention is to provide a resin regeneration system, as aforesaid, in which downstream filtration columns can detect the outbound flow rate of resin being cycled out of the first filtration column and adjust downstream flow rates accordingly.

Still another object of this invention is to provide a resin regeneration system, as aforesaid, that provides continuous recycling of resin in a filtration system rather than batch processing.

Yet another object of this invention is to provide a resin regeneration system, as aforesaid, that increases efficiency and profit of a filtration system.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
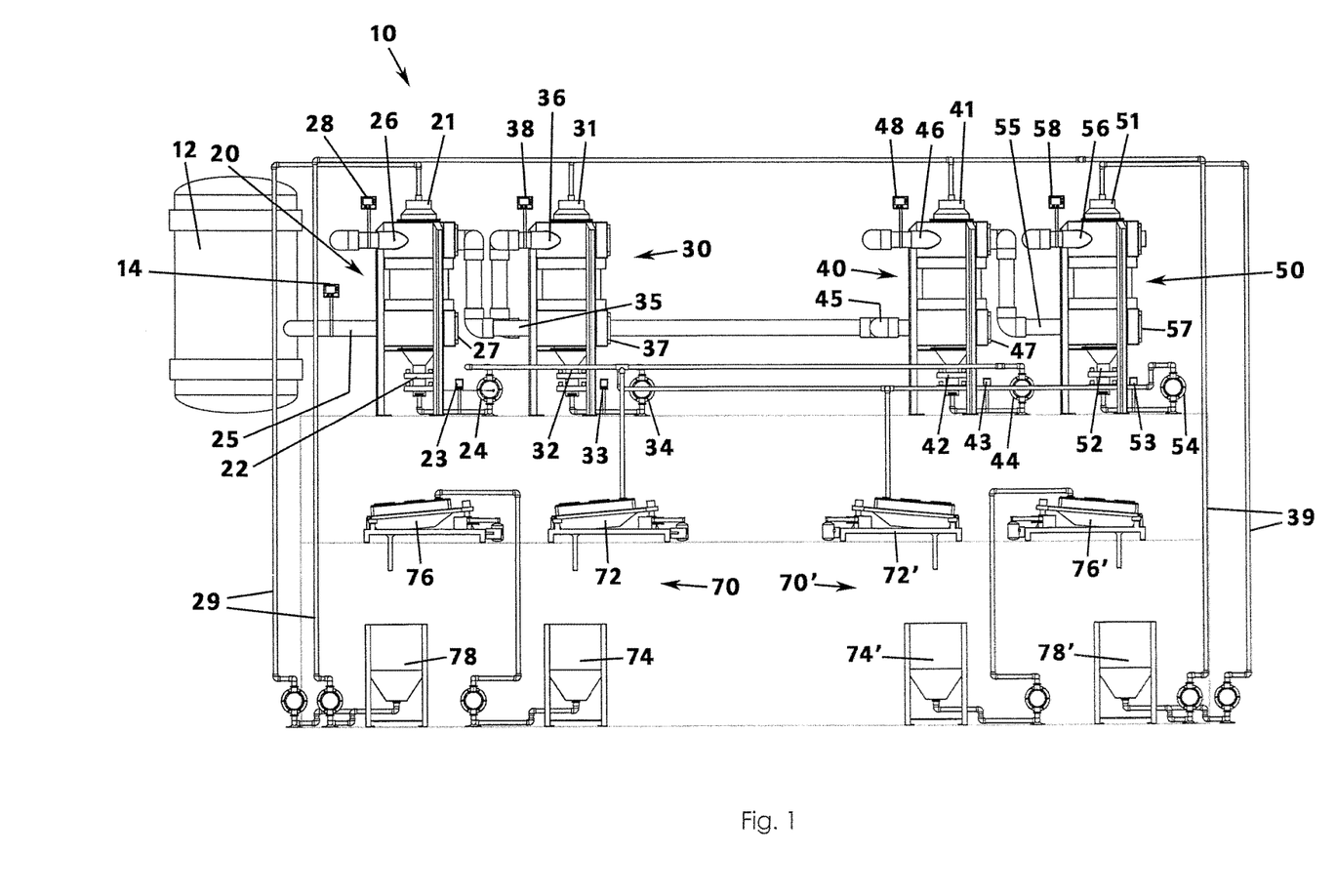
FIG. 1 is a front view of a continuous resin regeneration system according to the present invention.
Figure 2:
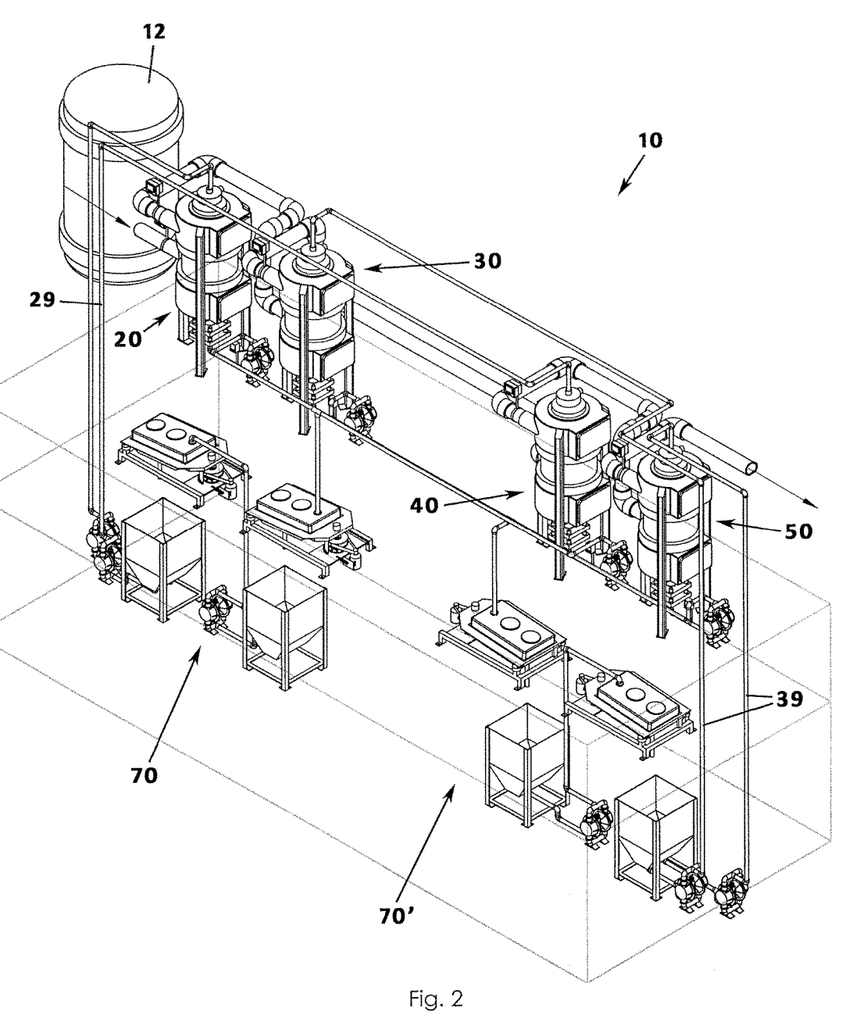
FIG. 2 is a perspective view of the system as in FIG. 1.
Figure 3:
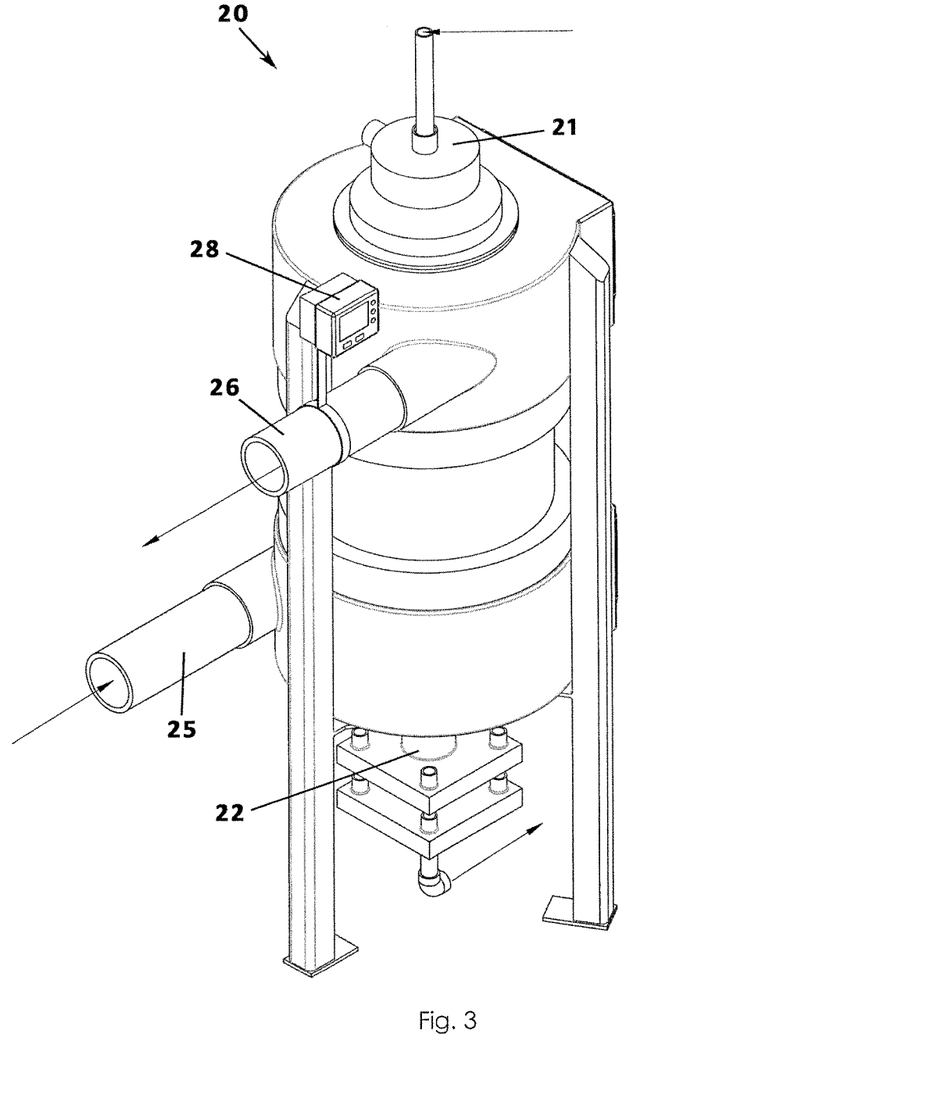
FIG. 3 is an isolated perspective view the first filtration column according to the present invention as shown in FIG. 2, the unnumbered lines with arrows indicating direction of fluid flow.
Figure 4:
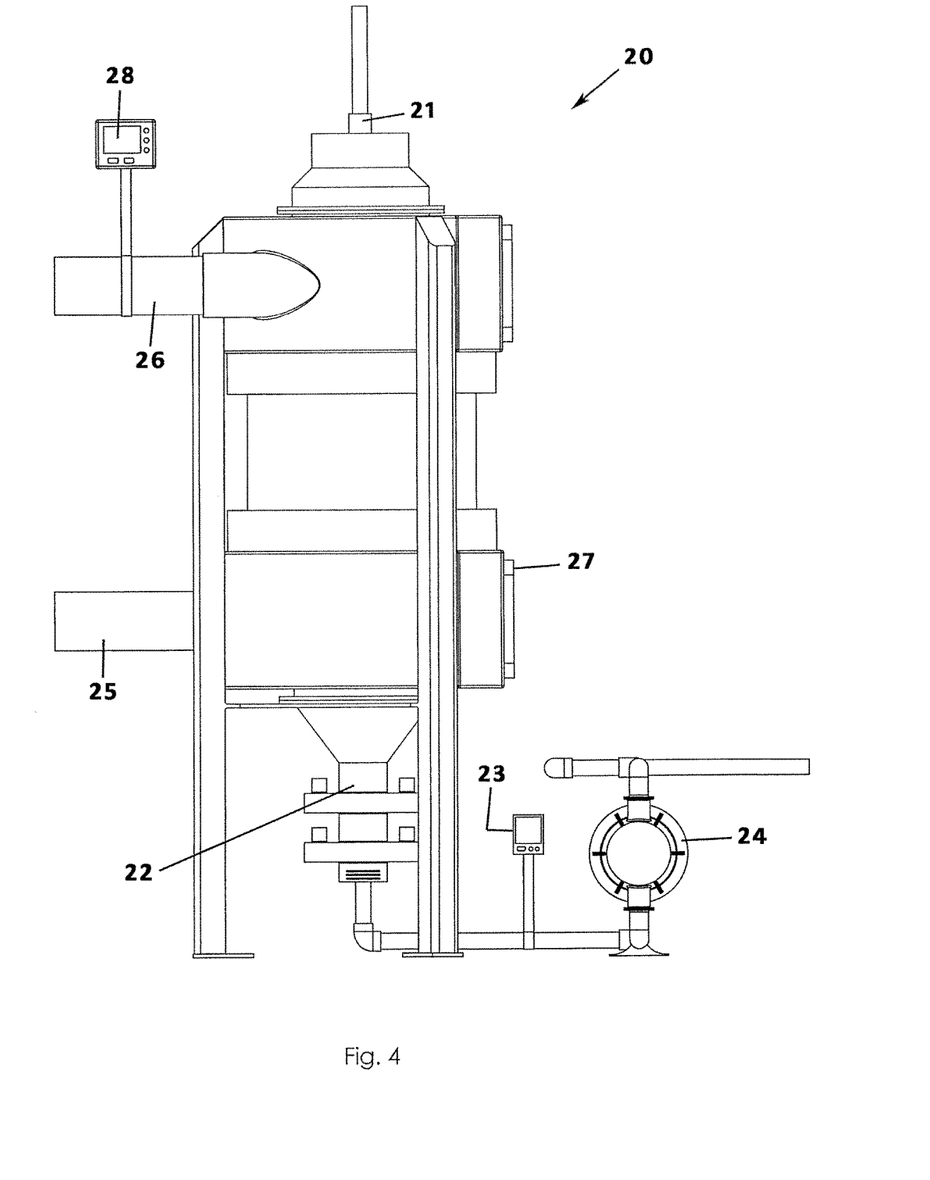
FIG. 4 is a front view of the first filtration column as in FIG. 1.
Figure 5:
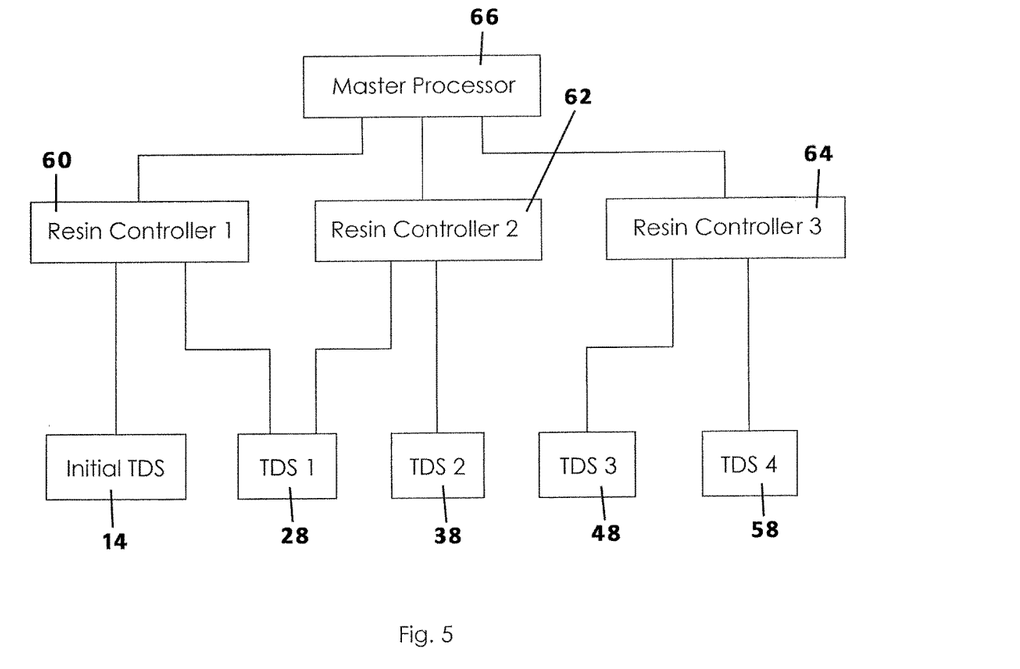
FIG. 5 is a block diagram illustrating the electronic structures according to the present invention.

A continuous resin regeneration system according to a preferred embodiment of the present invention will now be described with reference to FIGS. 1 to 5 of the accompanying drawings. The continuous resin regeneration system 10 includes a first filtration column 20, a second filtration column 30, a third filtration column 40, a fourth filtration column 50, and so on. In addition, the continuous resin regeneration system 10 includes at least a first screening assembly 70 and a second screening assembly 70' associated with respective filtrations columns. First, it is noted that unnumbered lines with arrows are included, such as in FIG. 3, to indicate the direction of fluid flow and not to reference a specific part.

The contaminated water to be purified by the present system is represented as coming from a contaminated water tank 12, the degree of contamination of which is determined by an initial total dissolved solids (TDS) meter 14. In addition, another TDS meter is associated with a water outlet of each column, the resins discussed in this specification are ion-exchange resins. Ion-exchange resins are widely used in purification and decontamination processes such as in water purification systems. A resin may include an insoluble matrix of beads or microbeads. Preferably, the first resin discussed below is a weak cation resin composition and the second resin is a weak base anion resin. It will also be appreciated that the first filtration column 20 and third filtration column 40 will receive the first resin, such as by piping and potentially from the first screening assembly 70, while the second filtration column 30 and fourth filtration column 50 will receive the second resin as will be described below.

The first filtration column 20 includes a casing having a continuous side wall enclosed by top and bottom walls that collectively define a first interior area. The first filtration column 20 includes a first resin inlet 21, preferably in operable communication with the top wall, for receiving a first resin into the first interior area at a first resin flow rate. It is understood that the first resin may be received from the first screening assembly 70 which will be described later. The first resin flow rate may be set at a predetermined or programmed "target" rate and may also be detected and may be increased or decreased while setting a downstream resin flow rate as will be described later in more detail. In an embodiment, the first resin may be a weak acid cation resin. It is understood that the first resin will be degraded or degenerated as the first resin cleans a contaminated water stream flowing through the first filtration column 20 at a predetermined water flow rate. Further, the first filtration column 20 includes a first resin outlet 22 that is operable for directing a first degenerated resin portion out of the interior area of the first filtration column 20 according to a first resin control assembly having a first pump controller 23 and first pump 24 in fluid communication with the first resin outlet 22.

In addition, the first filtration column 20 includes a first water inlet 25 operable and configured for receiving a contaminated water stream into the interior area of the first filtration column 20. The first water inlet 25 may include piping extending between a dirty water source (not shown) and the continuous side wall of the casing of the first filtration column 20. It is understood that the first water inlet 25 is positioned proximate or adjacent the bottom wall of the casing of the first filtration column 20 such that the contaminated water flow from bottom to top. The first filtration column 20 also includes a first water outlet 26 positioned adjacent a top wall of the casing of the first filtration column 20. The first water outlet 26 may include piping in fluid communication with the interior area of the casing of the first filtration column 20 and may extend therefrom to the second water inlet 35 of the second filtration column 30 which will be described in more detail later. Again, the water flow in a respective casing is from bottom-to-top whereas a respective resin flow is from top-to-bottom.

With further reference to the first filtration column 20, the first resin may at first be retained on a first filter 27 which may also be referred to as a first filter shelf, first filter screen, or first filter compartment over which a flow of contaminated water flows and is cleaned. As the contaminated water stream flows over or through the first filter 27, the water is cleaned as contaminates are eliminated or dislodged by action of the first resin on the first filter 27 and in the interior area of the first filtration column 20. Eventually, a first resin remaining in a respective first filter 27 may be slidably removed from the casing and replaced. More than one first filter 27 may be included in the first filtration column 20. In a predictable correlation, the first resin in the first filtration column is degraded or degenerated in a predictable correlation to the degree of contamination of the contaminated water stream as will be understood in the following description.

According to the present invention, a portion of the degenerated first resin is continuously removed from or, stated another way, is continuously directed through the first resin outlet 22 according to a first resin flow rate and as controlled by the first resin control assembly. The degenerated first resin is directed, such as via piping, to the first screening assembly 70 where it is cleaned and regenerated as will be described in more detail later.

Having a construction substantially similar to the first filtration column 20, the second filtration column 30 includes a casing having a continuous side wall enclosed by top and bottom walls that collectively define a second interior area. The second filtration column 30 includes a second resin inlet 31, preferably in operable communication with the top wall, for receiving a second resin into the second interior area at a second resin flow rate. It is understood that the second resin may be received from the second screening assembly 70' which will be described later. Preferably, the second resin is a weak base anion resin. The second resin flow rate may be set at a predetermined or programmed "target" rate and may also be detected and modified for application to a downstream column as will be described later in more detail. It is understood that the second resin will be degraded or degenerated as the second resin cleans a contaminated water stream flowing through the second filtration column 30. Further, the second filtration column 30 includes a second resin outlet 32 that is operable for directing a second degenerated resin portion out of the interior area of the second filtration column according to a second resin control assembly having a second pump controller 33 and second pump 34 operably coupled to the second resin outlet 32.

In addition, the second filtration column 30 includes a second water inlet 35 constructed and configured for receiving a contaminated water stream into the interior area of the second filtration column 30. The second water inlet 35 may include piping extending between the first water outlet 26 and the continuous side wall of the casing of the second filtration column 30. It is understood that the second water inlet 35 is positioned proximate or adjacent the bottom wall of the casing of the second filtration column 30 such that the contaminated water flows from bottom to top. The second filtration column 30 also includes a second water outlet 36 positioned adjacent a top wall of the casing of the second filtration column 30. The second water outlet 36 may include piping in fluid communication with the interior area of the casing of the second filtration column 30 and extends therefrom to the third water inlet 45 of the third filtration column 40 which will be described in more detail later. Again, the water flow in a respective casing is from bottom-to-top whereas a respective resin flow is from top-to-bottom.

With further reference to the second filtration column 30, the second resin may at first be retained on a second filter 37 which may also be referred to as a second filter shelf, second filter screen, or second filter compartment over which a flow of contaminated water flows and is cleaned. As the contaminated water stream flows over and through the second filter 37, the water is cleaned as contaminates are eliminated or dislodged. Of course, a filtration column may have more than one filter or shelf for managing a flow rate of resin. Eventually, a second resin remaining in a respective second filter 37 may be slidably removed from the casing and replaced. In a predictable correlation, the second resin in the second filtration column 30 is degraded or degenerated in a predictable correlation to the degree of contamination of the contaminated water stream.

According to the present invention, a portion of the degenerated second resin is removed continuously from or, stated another way, is continuously directed through the second resin outlet 32. The degenerated second resin is directed, such as via piping, to the second screening assembly 70' where it is cleaned and regenerated as will be described in more detail later.

In the exemplary embodiment described in this application, the continuous resin regeneration system 10 also includes a third and fourth filtration column. Specifically, the third filtration column 40 includes a casing having a continuous side wall enclosed by top and bottom walls that collectively define a third interior area. The third filtration column 40 includes a third resin inlet 41, preferably in operable communication with the top wall, for receiving the first resin (same as the first resin described relative to the first filtration column) into the third interior area at a third resin flow rate. Importantly, the third resin flow rate is determined by a comparison of a degree of contamination of the contaminated water stream before the first filtration column 20 (i.e. the initial degree of contamination), a degree of contamination before the second filtration column 30 (i.e. immediately after treatment by the first filtration column 20), and the first resin flow rate itself, respectively, these comparisons being made by a first resin controller 60 as will be described in more detail later. It is understood that the first resin may be received from the first screening assembly 70 which also will be described later. It is understood that the first resin will be degraded or degenerated as the first resin cleans the contaminated water stream flowing through the third filtration column 40. Further, the third filtration column 40 includes a third resin outlet 42 that is operable for directing a third degenerated resin portion out of the interior area of the third filtration column 40 according to a third resin control assembly having a third pump controller 43 and third pump 44 operably coupled to the third resin outlet 42.

In addition, the third filtration column 40 includes a third water inlet 45 constructed and configured for receiving a contaminated water stream into the interior area of the third filtration column 40. The third water inlet 45 may include piping extending between second water outlet 36 and the continuous side wall of the casing of the third filtration column 40. It is understood that the third water inlet 45 is positioned proximate or adjacent the bottom wall of the casing of the third filtration column 40 such that the contaminated water flows from bottom to top. The third filtration column 40 also includes a third water outlet 46 positioned adjacent a top wall of the casing of the third filtration column 40. The third water outlet 46 may include piping in fluid communication with the interior area of the casing of the third filtration column 40 and extends therefrom to the fourth water inlet 55 of the fourth filtration column 50 which will be described below. Again, the water flow in a respective casing is from bottom-to-top whereas a respective resin flow is from top-to-bottom.

With further reference to the third filtration column 40, the first resin may at first be retained on a third filter 47 which may also be referred to as a third filter shelf, a third filter screen, or third filter compartment over which a flow of contaminated water flows and is cleaned. As the contaminated water stream flows over and through the third filter 47, the water is cleaned as contaminates are eliminated or dislodged. Of course, a filtration column may have more than one filter or shelf for managing a flow rate of resin. On occasion, the first resin remaining in a respective third filter 47 may be slidably removed (e.g. by sliding out the shelf) from the casing and replaced. In a predictable correlation, the first resin in the third filtration column 40 is degraded or degenerative in a predictable correlation to the degree of contamination of the contaminated water stream.

According to the present invention, a portion of the degenerated first resin is removed continuously from or, stated another way, is continuously directed through the third resin outlet 42. The degenerated first resin is directed, such as via piping, to the first screening assembly 70 where it is cleaned and regenerated as will be described in more detail later.

Then, the fourth filtration column 50 includes a casing having a continuous side wall enclosed by top and bottom walls that collectively define a fourth interior area. The fourth filtration column 50 includes a fourth resin inlet 51, preferably in operable communication with the top wall, for receiving the second resin (same as the second resin described relative to the second filtration column) into the fourth interior area at a fourth resin flow rate. It is understood that the second resin may be received from the second screening assembly 70'. Preferably, the second resin is a weak base anion resin. The fourth resin flow rate may be determined by a second resin controller 62 after comparing a second degree of contamination (of the contaminated water stream), a first degree of contamination, and the second resin flow rate, respectively, and this fourth resin flow rate being used to control the fourth filtration column 50. It is understood that the resin in the fourth filtration column 50 will be degraded or degenerated as the second resin cleans the contaminated water stream flowing through the fourth filtration column 50. Further, the fourth filtration column 50 includes a fourth resin outlet 52 that is operable for directing a fourth degenerated resin portion out of the interior area of the fourth filtration column 50 according to a fourth resin control assembly having a fourth pump controller 53 and fourth pump 54 operably coupled to the second resin outlet 32.

In addition, the fourth filtration column 50 includes a fourth water inlet 55 constructed and configured for receiving a contaminated water stream into the interior area of the fourth filtration column 50. The fourth water inlet 55 may include piping extending from the third water outlet 46 and the continuous side wall of the casing of the fourth filtration column 50. It is understood that the fourth water inlet 55 is positioned proximate or adjacent the bottom wall of the casing of the fourth filtration column 50 such that the contaminated water flows from bottom to top. The fourth filtration column 50 also includes a fourth water outlet 56 positioned adjacent a top wall of the casing of the fourth filtration column 50. The fourth water outlet 56 may include piping in fluid communication with a holding tank (not shown) where it may be directed in part to either the first screening assembly 70 or the second screening assembly 70' which will be described later or directed downstream to a next subsequent filtration column in an embodiment having more than four columns.

With further reference to the fourth filtration column 50, the second resin may at first be retained on a fourth filter 57 which may also be referred to as a fourth filter shelf, a fourth filter screen, or a fourth filter compartment over which a flow of contaminated water flows and is cleaned. As the contaminated water stream flows over and through the fourth filter 57, the water is cleaned as contaminates are eliminated or dislodged. Of course, a filtration column may have more than one filter or shelf for managing a flow rate of resin. On occasion, the second resin remaining in a respective fourth filter 57 may be slidably removed (e.g. by sliding out the shelf) from the casing and replaced. In a predictable correlation, the second resin in the fourth filtration column 50 is degraded or degenerated in a predictable correlation to the degree of contamination of the contaminated water stream.

According to the present invention, a portion of the degenerated second resin is removed continuously from or, stated another way, is continuously directed through the fourth resin outlet 52. The degenerated second resin is directed, such as via piping, to the second screening assembly 70' where it is cleaned and regenerated as will be described in more detail later.

In an important aspect, it has been realized that degeneration of the second resin occurs at a slower pace or rate than degeneration of the first resin—primarily because the contamination of the contaminated water stream flowing through the first filtration column 20 is significantly greater than the remainder of the contaminated water stream flowing through the second filtration column 30 and any subsequent downstream filtration column (such as the third or fourth filtration columns). In other words, as each respective column cleans a remainder of the contaminated water stream, the downstream water streams do not cause resin degeneration to the same extent or with the same speed and, consequently, the resin does not need to be directed to a respective screening assembly with the same flow rate, i.e. the remainder of the contaminated water stream does not need to be cleaned as much as in the first filtration column and the respective resin is not degraded with the same frequency and does not need to be recharged or itself cleaned. Accordingly, the second resin flow rate will be less than the first resin flow rate, the third resin flow rate will be less than the second resin flow rate, and so on.

To determine the exact downstream resin flow rates, each filtration column includes an associated total dissolved solids (TDS) meter. First, as described earlier, an initial TDS meter 14 is associated with the contaminated water reservoir 12 and determines an initial degree of contamination—to be used later for calculating downstream resin flow rates. Next, a first TDS meter 28 is in fluid communication with the first water outlet 26 and is programmed and operable to determine a level of contamination of the contaminated water stream after said stream has flowed through the first filtration column 20 and before said stream has flowed into the second filtration column 30. In other words, the first TDS meter 28 is downstream of the first filtration column 20 but upstream of the second filtration column 30.

Similarly, a second TDS meter 38 is in fluid communication with the second water outlet 36 and is programmed and operable to determine a level of contamination of the contaminated water stream after said stream has flowed through the second filtration column 30 and before said stream has flowed into the third filtration column 40. In other words, the second TDS meter 38 is downstream of the second filtration column 30 but upstream of the third filtration column 40.

Still further, a third TDS meter 48 is in fluid communication with the third water outlet 46 and is programmed and operable to determine a level of contamination of the contaminated water stream after said stream has flowed through the third filtration column 40 and before said stream has flowed into the fourth filtration column 50. In other words, the third TDS meter 48 is downstream of the third filtration column 40 but upstream of the fourth filtration column 50. As indicated above, the resin flowing through a downstream column will naturally degenerate at a slower or lesser rate than the second resin in the second filtration column 30 because the contaminated water will be less contaminated.

Similarly, a fourth TDS meter 58 is in fluid communication with the fourth water outlet 56 and is programmed and operable to determine a level of contamination of the contaminated water stream after the contaminated water stream has flowed through the fourth filtration column 50 and before said stream has flowed into the a holding reservoir (not shown). In other words, the fourth TDS meter 58 is downstream of the fourth filtration column 50.

In a critical aspect, a first resin controller 60 is in data communication with the initial TDS meter 14, first TDS meter 28, and the first filtration column 20 (so as to detect the first resin flow rate) and is programmed and operable to compare data from each, respectively. The first resin controller 60 may be a processor, a programmable controller, or equivalent wiring and electronic components. The first resin controller 60 is operable to determine the third resin flow rate and to communicate said rate to the third filtration column 40 as described above. More particularly, the first resin controller 60 may subtract the value detected by the first TDS meter 28 from the value detected by the initial TDS meter to determine a degree in which the contaminated water stream has been cleaned by operation of the first filtration column 20 (i.e. by exposure to the first resin). Then, the predetermined or target rate of the resin flow of the first resin may be increased or decreased and communication to the third filtration column as described above.

Similarly, a second resin controller 62 is in data communication with the first TDS meter 28, the second TDS meter 38, and the second filtration column 30 (so as to detect the second resin flow rate) and is programmed and operable to compare data from each, respectively. The first resin controller 60 may be a processor, a programmable controller, or equivalent wiring and electronic components. The first resin controller 60 is operable to determine the fourth resin flow rate and to communicate said rate to the fourth filtration column 50 as described above. More particularly, the second resin controller 62 may subtract the value detected by the second TDS meter 38 from the value detected by the first TDS meter to determine a degree in which the contaminated water stream has been cleaned by operation of the second filtration column 30 (i.e. by exposure to the second resin). Then, the predetermined or target rate of the resin flow of the second resin may be increased or decreased and communication to the fourth filtration column as described above.

Further, the present invention evaluates the "success" or efficiency with which the contaminated water stream is being cleaned. In other words, the contaminated water stream is checked after the water has passed through the third filtration column 40 and after the contaminated water stream has passed through the fourth filtration column 50 (and so on for systems having more than four filtration columns. Specifically, a third total dissolved solids (TDS) meter 48 and a fourth total dissolved solids (TDS) meter 58 are coupled to resin outlet of the third and fourth filtration columns. Then, a third resin controller 64 may be electrically connected to the third and fourth filtration columns and programmed or wired to compare the respective values (such as via a subtraction operation) so as to determine if the contaminated water stream is totally clean now or remains contaminated. The third resin controller 64 is then operable to increase the water flow rate of the system so that, going forward, the contaminated water stream will proceed through the columns and make contact with respective resins for either longer or shorter amounts of time to maximize the degree and efficiency of purifying the stream.

It should be appreciated that the references above to one or more resin controllers may, in some embodiments, be implemented using separate electronic control modules or electronics. It is preferred, however, that both resin controllers will be implemented as a single integrated controller or programmable central processing unit (i.e. a master processor 66). Reference to a first resin controller 60, a second resin controller 62, and a third resin controller 64, is simply a clearer means of describing the specific aspects of a processor programmed to make respective comparisons and then to set downstream resin flow rates as described above. Again, a single controller such as a master processor 66 may be programmed or hardwired to make the comparisons and settings described above and this relationship is represented and illustrated in FIG. 5.

As described above, degenerated resin exits a respective column into a respective resin outlet. Each filtration column is associated with a pump operable to direct resin from a respective resin outlet to a respective screening assembly. Preferably, the pump is an air diaphragm pump associated with each resin outlet and is operable to pump degenerated resin into a respective cleaner assembly, each pump being controlled by an associated and electrically connected pump controller. More particularly, degenerated resin from respective resin outlets 22 and 42 is pumped by respective pumps via a common first channel 29 or pipe to the first screening assembly 70 while degenerated resin from respective resin outlets 32 and 52 is pumped by respective pumps via a common second channel 39 or pipe to the second screening assembly 70'. The first and second screener assemblies are operable for continuously reconditioning a respective resin as will now be described in detail.

The first screening assembly 70 includes a first assembly primary sifter 72 that receives a degenerated first resin from the first channel 29, a first assembly primary holding hopper 74, a first assembly auxiliary sifter 76, and a first assembly auxiliary holding hopper 78. When the resin enters the first assembly primary sifter 72, a dewatering step occurs, that is to say, the water used to carry the resin to the first screening assembly 70 is allowed to pass through a screen. As the degenerated resin moves down the screen, pre-conditioned water is sprayed onto the degenerated resin. Contaminates are then released from the surface of the resin. Both the water that has been removed from the resin and the water washing the resin are collected in a pan under the first assembly primary sifter 72. The water from the first assembly primary sifter 72 is pumped by an end suction centrifugal pump to the first assembly primary holding hopper 74 where it soaks for a predetermined time in pre-conditioned water. The resin is then pumped by a dual diaphragm pump to the first assembly auxiliary sifter 76, where dewatering and cleaning occurs again. The water is collected in a pan under the first assembly auxiliary sifter 76 and gravity flows back to a deep bed filter. The water passing through the filter media is then pumped by a centrifugal pump back to the spray wash or a first assembly auxiliary holding hopper for reconditioning. In other words, when the resin drops out of the first assembly auxiliary sifter 76, it is collected in the first assembly auxiliary holding hopper 78. Clean water is added and the reconditioned or regenerated first resin is pumped back to the top of the first and third columns, as determined by a respective TDS meter. The treated water receives approximately 6% solution of acid+. The dilution may be determined by an Oxidation-Reduction Potential ("ORP") meter.

The second screening assembly 70' and its associated components have a construction and function that is substantially similar to that of the first screening assembly and, therefore, primed reference numerals will be used in the drawings without a full description in the specification. However, it will be appreciated that treated water will be a 6% solution of a base. And for sake of later references, the second screening assembly 70' includes a second assembly primary sifter 72', a second assembly primary holding hopper 74', a second assembly auxiliary sifter 76', and a second assembly auxiliary holding hopper 78'. And, the second resin, once reconditioned, may be pumped back into the second and fourth filtration columns as described above.

In use, a continuous resin regeneration system includes a process by which resin in need of being recharged is cycled out of a filtration "column" as new resin is flowed in. Downstream filtration columns also undergo this cycling but at slower and related rates as the first column with the dirtiest water will naturally degrade resin faster than the downstream columns.

It is understood that while certain forms of this invention have been illustrated and described, it is not limited thereto except insofar as such limitations are included in the following claims and allowable functional equivalents thereof.

The invention claimed is:

1. A continuous resin regeneration system for use in cleaning water from a contaminated water reservoir, comprising:
   a first filtration column defining a first interior area and having a first resin inlet operable for receiving a first resin into said first interior area at a first resin flow rate that is a predetermined resin flow rate, a first resin outlet operable for directing a first degenerated resin portion of said first resin out of said first interior area, a first water inlet operable for receiving a contaminated water stream into said first interior area at a water flow rate, and a first water outlet operable for directing said contaminated water stream out of said first interior area according to said first resin flow rate;
   a second filtration column defining a second interior area and having a second resin inlet operable for receiving a second resin into said second interior area at a second resin flow rate which is a predetermined resin flow rate, a second resin outlet operable for directing a second degenerated resin portion of said second resin out of said second interior area, a second water inlet in communication with said first water outlet operable for receiving said contaminated water stream into said second interior area at said water flow rate, and a second water outlet operable for directing said contaminated water stream out of said second interior area;
   an initial total dissolved solids (TDS) meter in communication with said first water inlet for determining an initial degree of contamination of said contaminated water stream prior to said water stream entering said first interior area;
   a first total dissolved solids (TDS) meter in communication with said first water outlet that is operable for determining a first degree of contamination of said contaminated water stream after said contaminated water stream has passed through said first interior area;
   a second total dissolved solids (TDS) meter in communication with said second water outlet that is operable for determining a second degree of contamination of said contaminated water stream after said contaminated water stream has passed through said second interior area;
   a first resin controller operable for determining a third resin flow rate by evaluating said initial degree of contamination relative to said first degree of contamination and said first resin flow rate, said third resin control rate increasing or decreasing said first resin flow rate according to said comparisons of said initial degree of contamination, said first degree of contamination, and said first resin flow rate, respectively; and
   a second resin controller operable for determining a fourth resin flow rate by evaluating said second degree of contamination relative to said first degree of contamination and to said second resin flow rate, said fourth resin control rate increasing or decreasing said second resin flow rate according to said comparisons of said second degree of contamination, said first degree of contamination, and said second resin flow rate, respectively.

2. The continuous resin regeneration system as in claim 1, further comprising:
   a third filtration column defining a third interior area and having a third resin inlet operable for receiving said first resin into said third interior area at said third resin flow rate, a third resin outlet operable for directing a third degenerated resin portion of said first resin out of said third interior area, a third water inlet in communication with said second water outlet that is operable for receiving said contaminated water stream into said third interior area at said water flow rate, and a third water outlet for directing said contaminated water stream out of said third interior area;
   a third total dissolved solids (TDS) meter in communication with said third water outlet that is operable for determining a third degree of contamination of said contaminated water stream after said water stream has passed through said third interior area;
   a fourth filtration column defining a fourth interior area and having a fourth resin outlet operable for receiving said second resin into said fourth interior area at said fourth resin flow rate, a fourth resin outlet operable for directing a fourth degenerated resin portion of said second resin out of said second interior area, a fourth water inlet in communication with said third water outlet for receiving said contaminated water stream into said fourth interior area at said water flow rate, and a fourth water outlet operable for directing said contaminated water stream out of said fourth interior area;
   a fourth total dissolved solids (TDS) meter in communication with said fourth water outlet that is operable for determining a fourth degree of contamination of said contaminated water stream prior to said contaminated water stream entering said fourth interior area; and
   a third resin controller operable for determining a successful decontamination parameter by evaluating said fourth degree of contamination relative to said third degree of contamination and to said fourth resin flow rate, said successful decontamination parameter causing an increase or decrease of said water flow rate, respectively.

3. The continuous resin regeneration system as in claim 1, further comprising:
   a first resin control assembly coupled to said first resin outlet, said first resin control assembly having a first pump controller and a first resin pump operable for directing said first resin out of said first interior area according to said first resin flow rate;
   a second resin control assembly coupled to said second resin outlet, said second resin control assembly having a second pump controller and a second resin pump operable for directing said second resin out of said second interior area according to said second resin flow rate.

4. The continuous resin regeneration system as in claim 3, further comprising:
   a third resin control assembly coupled to said third resin outlet, said third resin control assembly having a third pump controller and a third resin pump operable for directing said first resin out of said third interior area according to said third resin flow rate;
   a fourth resin control assembly coupled to said fourth resin outlet, said fourth resin control assembly having a fourth pump controller and a fourth resin pump operable for directing said second resin out of said fourth interior area according to said fourth resin flow rate.

5. The continuous resin regeneration system as in claim 2, wherein:
said second resin flow rate is less than said first resin flow rate;
said third resin flow rate is less than said second resin flow rate.

6. The continuous resin regeneration system as in claim 5, wherein said fourth resin flow rate is less than said third resin flow rate.

7. The continuous resin regeneration system as in claim 1, wherein:
said first filtration column includes a first filtration screen removably positioned in said first interior area and operable to hinder movement of said first resin through said first filtration screen in motion between said first resin inlet and said first resin outlet according to a first predetermined flow rate;
said second filtration column includes a second filtration screen removably positioned in said second interior area and operable to hinder movement of said second resin through said second filtration screen in motion between said second resin inlet and said second resin outlet according to a second predetermined flow rate.

8. The continuous resin regeneration system as in claim 7, wherein:
said third filtration column includes a third filtration screen removably positioned in said third interior area and operable to hinder movement of said first resin through said third filtration column in motion between said third resin inlet and said third resin outlet according to a third predetermined flow rate;
said fourth filtration column includes a fourth filtration screen removably positioned in said fourth interior area and operable to hinder movement of said fourth resin through said fourth filtration screen in motion between said fourth resin inlet and said fourth resin outlet according to a fourth predetermined flow rate.

9. The continuous resin regeneration system as in claim 2, comprising:
a first screening assembly having a primary inlet port in fluid communication with said first resin outlet that is operable for receiving said first degenerated portion and having at least a first primary sifter operable for removing contaminates from said first degenerated resin portion; and
a second screening assembly having a secondary inlet port in fluid communication with said second resin outlet that is operable for receiving said second degenerated portion and having at least a first secondary sifter operable for removing contaminates from said second degenerated resin portion.

10. The continuous resin regeneration system as in claim 9, wherein:
said primary inlet port of said first screening assembly is in fluid communication with said third resin outlet and operable to receive said third degenerated portion and wherein said first primary sifter is operable for removing contaminates from said third degenerated resin portion;
wherein said secondary inlet port of second screening assembly is in fluid communication with said fourth resin outlet and operable to receive said fourth degenerated portion and wherein said first secondary sifter is operable for removing contaminates from said fourth degenerated resin portion.

11. The continuous resin regeneration system as in claim 10, wherein said first screening assembly includes:
a first primary hopper having a first reservoir containing a cation solution and defining an open top operable for receiving said first degenerated resin from said first primary sifter into said first reservoir;
wherein said first primary hopper is in fluid communication with said first resin inlet of said first filtration column.

12. The continuous resin regeneration system as in claim 11, wherein said second screening assembly includes:
a first secondary hopper having a second reservoir containing an anion solution and defining an open top operable for receiving said second degenerated resin from said first secondary sifter into said second reservoir;
wherein said first secondary hopper is in fluid communication with said second resin inlet of said second filtration column.

13. The continuous resin regeneration system as in claim 12, wherein said first screening assembly includes:
a second primary sifter in fluid communication with said first primary hopper and operable for cleaning said first degenerated resin;
a second primary hopper having a second reservoir containing a cation solution and defining an open top operable for receiving said first degenerated resin from said second primary sifter into said second reservoir;
wherein said second primary hopper is in fluid communication with said first resin inlet of said first filtration column.

14. The continuous resin regeneration system as in claim 13, wherein said second screening assembly includes:
a second secondary sifter in fluid communication with said first secondary hopper and operable for cleaning said second degenerated resin;
a second secondary hopper having a reservoir containing an anion solution and defining an open top operable for receiving said second degenerated resin from said second secondary sifter into said reservoir;
wherein said second secondary hopper is in fluid communication with said second resin inlet of said second filtration column.

15. The continuous resin regeneration system as in claim 1, wherein:
said first resin is a weak acid cation resin;
said second resin is a weak base anion resin.

* * * * *